United States Patent

[11] 3,625,993

| [72] | Inventor | Hans Peter Horn<br>Orinda, Calif. |
|---|---|---|
| [21] | Appl. No. | 723,286 |
| [22] | Filed | Apr. 22, 1968 |
| [45] | Patented | Dec. 7, 1971 |
| [73] | Assignee | Kaiser Aluminum & Chemical Corporation<br>Oakland, Calif.<br>Continuation-in-part of application Ser. No. 674,758, Oct. 12, 1967, now abandoned.<br>This application Apr. 22, 1968, Ser. No. 723,286 |

[54] PROCESS FOR PRODUCING CARBAMATES
16 Claims, No Drawings

[52] U.S. Cl. ..................................................... 260/479 C,
260/455 A, 260/482 C, 260/544 C
[51] Int. Cl. ....................................................... C07c 125/06

[50] Field of Search........................................... 260/479 C,
482 C

[56] References Cited
UNITED STATES PATENTS
3,057,910  10/1962  Fischer et al. ................  260/479

Primary Examiner—James A. Patten
Attorneys—James E. Toomey, Paul E. Calrow, Harold L. Jenkins and Andrew E. Barlay ABSTRACT: Carbamates are produced by reacting alkyl amines with phosgene, directly admixing the resultant reaction mixture containing N-alkyl-carbamoyl chloride and alkyl isocyanate with an active hydrogen containing compound selected from the group consisting of aliphatic alcohols and thioalcohols, phenols and thiophenols, alicyclic alcohols and thioalcohols. The produced carbamate is recovered from this mixture in high-yield and purity.

PROCESS FOR PRODUCING CARBAMATES

This application is a continuation-in-part of my copending application Ser. No. 674,758, filed Oct. 12, 1967, and now abandoned.

BACKGROUND OF THE INVENTION

The present invention relates to the production of high-purity carbamates directly from the alkyl amine-phosgene reaction mixture by admixture with an active hydrogen containing compound.

The produced carbamates have many utilities, such as insecticides, herbicides and pesticides, the high-purity carbamate may also be employed as a stabilizer for isocyanates and also find uses in the pharmaceutical field.

The reaction between alkyl amines and phosgene is known.

It is also known to prepare carbamates by reacting isocyanates with an active hydrogen containing compound. The alkyl amine-phosgene reaction yields beside isocyanate, alkyl-carbamoyl chloride, HCL, alkyl amine hydrochloride and other impurities, which has required the isolation of the alkyl isocyanate in order to obtain a pure carbamate in good yield.

The process of the present invention eliminates this isolation step by directly employing the reaction mixture obtained by phosgenation for the production of carbamates in high-purity. Elimination of the isolation step increases the yield of the carbamate produced based on the alkyl amine, without sacrificing the quality of the desired product.

SUMMARY OF THE INVENTION

The process of the present invention produces a carbamate of high-purity directly from the reaction mixture obtained by the phosgenation of an alkyl amine. The phosgenation reaction mixture containing alkyl-carbamoyl chloride and isocyanate, is admixed with an active hydrogen containing compound selected from the group consisting of aliphatic alcohols and thioalcohols, phenols and thiophenols, alicyclic alcohols and thioalcohols, to produce a major amount of carbamate in the equilibrium mixture. The available HCL, if desired, is reacted with an acid acceptor thereby producing a salt which is removed from the admixture. Unreacted alkyl-carbamoyl chloride is thereby converted to alkyl isocyanate by reaction with the acid acceptor and the alkyl isocyanate in turn reacts with the unreacted active hydrogen containing compound in the presence of a catalyst to complete the carbamate formation. From the admixture the high-purity carbamate is then recovered.

DETAILED DESCRIPTION OF THE INVENTION

It was found that carbamates having the general structure of $R_1-NH-COX-R_2-Y$, wherein $R_1$ is selected from straight chain or branched chain alkyl groups, X is selected from oxygen and sulfur, $R_2$ is an aliphatic, aromatic or alicyclic hydrocarbon and Y is selected from hydrogen and straight chain and branched chain alkyl groups, bromine or chlorine, can be produced directly in high yield and purity from the reaction mixture obtained from phosgenation of alkyl amines without the necessity of isolating the alkyl isocyanate produced by the phosgenation reaction.

It was further found, that when $R_1$ is an alkyl group having one to eight carbon atoms, Y is hydrogen, bromine, chlorine or an alkyl group having one to six carbon atoms, $R_2$ is an aliphatic, aromatic or alicyclic hydrocarbon and X is oxygen or sulfur, the carbamate produced will be produced in yields exceeding 95 percent based on the alkyl amine reacted with phosgene and will exhibit insecticidal properties.

The process of the present invention can be employed with particular advantage in the production of pentyl-phenyl-N-methyl carbamate containing less than 2 percent by weight of allophanate and less than 0.5 percent by weight of pentyl-phenol as impurities.

The process of the present invention comprises several process steps enabling the formation of carbamates without the isocyanate isolation step. These process steps are as follows:

Preparation of alkyl-carbamoyl chloride and alkyl isocyanate from an alkyl amine and phosgene;

Production of a major amount of carbamate by directly admixing the reaction mixture obtained by the phosgenation reaction with an active hydrogen containing compound.

If desired, the carbamate formation reaction can be followed by conversion of the available HCl to a salt by the addition of an acid acceptor and by the subsequent conversion of any unreacted alkyl-carbamoyl chloride to alkyl isocyanate. The formed alkyl isocyanate is then further reacted with the active hydrogen containing compound in the presence of a catalyst to complete the carbamate formation. The carbamate produced is then recovered in high-yield and purity.

The first step of the process involves the preparation of an alkyl-carbamoyl chloride by reacting an alkyl amine with phosgene.

Generally, the reaction between an alkyl amine and phosgene can be represented by the following equation: $R-NH_2 + COCl_2 \longrightarrow R-NCO + 2HCl$ (1) $R-NCO+2HCL$ (1) Undesired side reactions can take place unless phosgene is present in molar excess.

At temperatures below 80°–100° C., the following reaction takes place: $R-NCO + HCl \longrightarrow R-NHCOCL$ (2)

It is advantageous to conduct the reaction between the alkyl amine and phosgene at temperatures above 150° C. to minimize the occurrence of side reactions. In order to obtain the best yields, reaction temperatures of from about 200° C. to about 400° C. are employed. Within these temperature limits, the alkyl-carbamoyl chloride and isocyanate formation proceeds satisfactorily. The reaction between the alkyl amine and phosgene can be accomplished in a known manner, the alkyl amine and phosgene streams can be preheated to the desired temperature or introduced into the reactor at any desired temperature and heated within the reactor to the reaction temperature.

In a preferred manner, both the alkyl amine and the phosgene are introduced into a reactor which is preheated to the reaction temperature, through a mixer, said mixer also being maintained at the desired reaction temperature. The residence time within the reactor depends on the reaction temperature and pressure and at temperatures between about 200° and 400° C. the residence time within the reactor is less than 5 minutes, preferably less than 1 minute.

In order to obtain a high-conversion of the alkyl amine to the alkyl isocyanate according to equation (1), the mol ratio of phosgene to alkyl amine should be maintained at not less than 1.1:1. Lower phosgene to amine rations will significantly reduce the yield of the isocyanate resulting from the phosgenation. Mol ratios of phosgene to amine exceeding 1.1:1 will not significantly improve the yield of alkyl isocyanate The reaction between the alkyl amine and phosgene produces a reaction mixture, the major components within the temperature range of about 200° to 400° C. being the alkyl isocyanates and HCl Minor amounts of unreacted phosgene, amine hydrochloride and trace amounts of carbamoyl chloride are also present in the reaction mixture.

Alkyl amines suitable for accomplishing the process of the present invention include straight chain and branched chain alkyl amines having one to eight carbon atoms. Higher amines can also be employed; however, maintaining the gas phase phosgenation of these higher amines may result in process difficulties including possible undesired chemical side reactions.

The reaction mixture produced by the phosgenation reaction is then admixed with the active hydrogen containing compound.

The reaction between the above mixture produced by phosgenation and the major component of which as mentioned above is alkyl isocyanate, and the active hydrogen containing compound can be represented by the following equations:

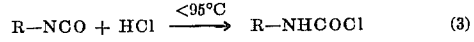

$$R-NCO + HCl \xrightarrow{<95°C} R-NHCOCl \quad (3)$$

$$R-NHCOCl + HX-R_2-Y \longrightarrow R-NHCOX-R_2-Y + HCl \quad (4)$$

wherein R—NHCOX—R$_2$—Y is the alkyl carbamate when X is oxygen and alkyl-thiocarbamate when X is sulfur.

The active hydrogen containing compound employed in the process is selected from the group consisting of aliphatic alcohols and thioalcohols, phenols and thiophenols, alicyclic alcohols and thioalcohols. The expression "active hydrogen containing compound" refers to such —OH and —SH group containing compounds wherein the active hydrogen is determined by the Zerewitinoff method.

The aliphatic alcohols and thioalcohols can possess straight or branched chain structure including saturated and unsaturated chains and representative examples include, but not limit the process to methyl-, ethyl-, butyl-, pentyl-, hexyl-, heptyl-, octyl- nonyl-, decylalcohols and their corresponding thiols. Higher alcohols are also useful in the present process.

The phenols suitable in the present process include those which possess monocyclic and condensed aromatic ring systems such as phenol, $\alpha$ and $\beta$ naphthol and anthranol and the corresponding thiophenols.

The alicyclic alcohols and thioalcohols include cyclopentanol, cyclohexanol and cycloheptanol and the corresponding alicyclic thioalcohols.

These active hydrogen containing compounds are employed in liquid state for the carbamate formation reaction and if the active hydrogen containing compound is solid at the carbamate formation reaction temperature, an inert solvent capable of dissolving the active hydrogen containing compound, but incapable of reacting with any of the reactants, is employed. Inert solvents for this purpose include aliphatic or aromatic hydrocarbons.

The Y substituent of the active hydrogen containing compound can either be hydrogen, chlorine, bromine or an alkyl group. The alkyl group can be a straight chain or branched chain aliphatic substituent; however, for the purposes of the present process an alkyl substituent is preferred which has one to six carbon atoms in the chain.

The reaction between the alkyl-carbamoyl chloride and the active hydrogen containing compound can be accomplished at temperatures below 120° C. As it is shown in equation (3), below 95° C., the major component of the phosgenation reaction will be the alkyl-carbamoyl chloride.

It was found that the carbamate formation reaction is followed by a consecutive reaction, which produces from the desired carbamate, the undesired byproduct allophanate. This side reaction can be represented by the following equation:

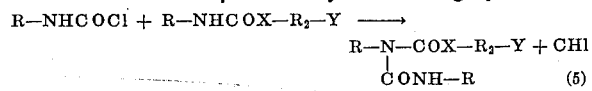

It was also found the temperatures above 95° C. favor the allophanate formation and the higher the temperature, the higher the relative rate of the allophanate formation. It is, therefore, recommended to maintain the carbamate formation reaction temperature below 95°C.

A suitable range of temperatures within which the carbamate formation can be accomplished with good yields and low-yield of allophanate byproduct is within 20° and 95° C., preferably 20° and 80°C.

The allophanate formation is also encouraged by a lack of HX—R$_2$—Y reactant. When the carbamoyl chloride lacks the HX—R$_2$—Y compound to form the carbamate, it will react with the already produced carbamate thereby reducing the carbamate yield and increasing the allophanate byproduct. In order to avoid this, it is advisable to employ a sufficient quantity of such alcoholic compound in a molecular ratio of about 0.9 to 1.1 mole of HX—R$_2$—Y per mol of R—NH$_2$ introduced into the phosgenation reaction. Higher alcohol to amine ratios can also be employed but these may result in difficulties when purifying the carbamate, particularly when a carbamate product is required having a HX—R$_2$—Y content less than 0.5 percent by weight. As mentioned before, lower HX—R$_2$—Y to R—NH$_2$ ratios are not recommended as they may increase the allophanate formation.

The reaction between the alkyl-carbamoyl chloride and the active hydrogen containing compound when conducted for 3–4 hours at temperatures between about 20° and 80° C. produces a major amount of carbamate. It is to be understood that the term "major amount" as used herein means that at least 50 percent of the alkyl-carbamoyl chloride admixed the the HX—R$_2$—Y compound is converted to the carbamate.

Subsequent to the conversion of a major amount of alkyl-carbamoyl chloride to the carbamate, the admixture will contain beside the carbamate, minor amounts of unreacted HX—R$_2$—Y, alkyl-carbamoyl chloride and HCL, further it will contain a total of less than 5 percent by weight of the admixture of alkyl isocyanate, allophanate and alkyl amine hydrochloride.

If desired, the HCl can be removed from this mixture by ordinary stripping operations conducted either at atmospheric pressure or at pressures lower than atmospheric. It is advantageous to use vacuum, as vacuum stripping can be accomplished at lower temperatures and thereby further allophanate formation will be avoided.

Alternatively to stripping of the HCl the admixture can be directly subjected to the next process step which comprises the addition of an acid acceptor such as a tertiary amine to form a salt with the available HCL.

Under the term of "available HCl," the following CL ion containing compounds are understood: dissolved HCl and HCl produced by conversion of alkyl-carbamoyl chloride to isocyanate. In addition, the HCl combined with the alkyl amine (R—NH$_2$HCL) may also be "available" if the acid acceptor employed in this process step possesses a base strength at least equal, that is equal to or higher than that of the R—NH$_2$.

The addition of the acid acceptor to the admixture will neutralize the available HCL.

As acid acceptor any compound can be employed which is adapted to combine with HCL. Representative acid acceptors suitable for this reaction include trimethyl amine, triethyl amine, pyridine, methylmorpholine, diethylcyclohexylamine, dimethylaniline and several other known tertiary amines selected from aliphatic, aromatic, alicyclic and heterocyclic tertiary amines. Further, CaO or Ca(OH)$_2$ can also be employed, but the water formed during the neutralization may reduce the yield of carbamate by reacting with the isocyanate present.

The quantity of acid acceptor to be added to the reaction mixture is established by determining the amount of acid acceptor equivalent to the available HCL. This can be accomplished by standard methods, such as acid-base titration, or titration with AgNO$_3$ solution.

The tertiary amine will also react with the unconverted carbamoyl chloride according to the following equation:
R—NHCOCL+(R$_x$)$_3$N → R—NCO+(R$_x$)$_3$N·HCl    (6)
thereby converting the alkyl-carbamoyl chloride to the corresponding alkyl isocyanate and neutralizing the generated HCL.

It was found, that when the tertiary amine is added to the admixture in amounts exceeding that required for neutralization of the available HCL, the alkyl isocyanate present in the admixture and the alkyl isocyanate generated by the conversion reaction shown in equation (6) will be catalytically converted to the desired carbamate by reacting with the unreacted active hydrogen containing compound present in the admixture. The catalytic conversion of the R—NCO to the carbamate is shown in the following equation:

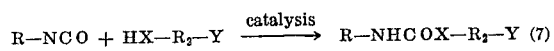

The amount of tertiary amine to be added for effecting the conversion of the isocyanate to the carbamate is a catalytic quantity and rapid rates of conversion can be obtained when the amount used for catalysis ranges between 1.5 and 2.5 percent by weight of the reaction mixture. In other words, when the amount of tertiary amine required for neutralization is 5 percent by weight of the admixture, an amount of 6.5 to 7.5 percent by weight of tertiary amine accomplishes the neutralization of the HCl present and also effects the catalytic conversion of the R—NCO to the carbamate within a reasonable time.

The catalysis of the R—NCO conversion to the carbamate can also be accomplished by other catalysts, such as the catalysts employed for converting isocyanates to urethanes. These catalysts are known in the art and representative examples include cobalt naphthanate, stannous octoate, tetra-n-butyltin, trimethyltin hydroxide, tri-n-butyltin acetate, di-n-butyltin dilaurate, dimethyl benzylamine, dimethyl stearyl amine and any other catalyst which will promote the reaction between the isocyanate groups and the alcoholic compound.

It is to be understood that the catalysts can be employed individually or in admixture including the use of the tertiary amine alone or in admixture with other catalysts.

It was found that the conversion of the alkyl-carbamoyl chloride to the alkyl isocyanate and the catalytic conversion of the alkyl isocyanate can be advantageously accomplished at temperatures below 95° C., preferably between about 20° and 80° C. Within these temperature limits, the increase of allophanate formation is insignificant.

Subsequent to the catalytic conversion of the alkyl isocyanate to the carbamate, the carbamate final product can be recovered by conventional methods such as liquid-liquid extraction or by filtration of the precipitated $(R_r)_3N \cdot HCl$ salt. Liquid-liquid extraction, as employed in the present process, includes removal of the tertiary amine hydrochloride salt by washing with water, in the event the tertiary amine hydrochloride salt is soluble in water.

It was found, that in the event the tertiary amine hydrochloride is water soluble, purification of the carbamate can be accomplished in an advantageous manner, by acidifying the admixture containing the carbamate and impurities. The acidification is preferably carried out with a strong mineral acid; for example, HCl or $H_2SO_4$ and a pH of less than 6 is established in the admixture. The acidic environment of the admixture will prevent hydrolysis during water washing of the carbamate. The mineral acid will neutralize any unconverted tertiary amine present in the admixture.

The acidification is followed by washing with water. The volume of water employed for washing is not critical. It was, however, found that when the concentration of the tertiary amine salt in the water is maintained at about 40 to 60 percent, i.e., to each gram of tertiary amine salt 0.7 to 1.2 grams of water is added, good separation of the organic-aqueous phases and satisfactory removal of the tertiary amine salt is achieved.

The washing step can be advantageously accomplished at elevated temperatures, preferably within the temperature range of between about 50° to 80° C.

The water washing of the organic phase is repeated until substantially all of the water soluble components of the reaction mixture are removed. After the last phase separation, the organic phase will contain a small amount of water which can be removed by stripping at reduced pressure, if desired.

The yield of the carbamate produced by the present process exceeds 95 percent and it is unnecessary to remove the unreacted active hydrogen containing compound by distillation to obtain this yield.

The following examples serve to illustrate the invention without in any way limiting it.

EXAMPLE 1

1287 grams (13 mols) of phosgene, at a rate of 1.62 mols/hr., and 360 grams (11.6 mols) of methylamine, at a rate of 1.45 mols/hr., were fed through a coaxial, tubular mixer into a cylindrical reactor. The reactor was kept at 200°–275° C., and the residence time of the reaction mixture in the reactor was a nominal time of 6 seconds. The reaction mixture leaving the reactor was continuously introduced within a time period of 8 hours into a 3 liter, stirred flask such as a resin kettle which contained 1,728 grams (10.5 mols) of pentyl-phenol. The flask was maintained at 50° C. for the 8 hour-feed period and after discontinuance of the feed, was stirred at this temperature for an additional hour. The unreacted phosgene was collected in a cold trap and the HCl produced was introduced into a caustic scrubber. The reaction mixture was then analyzed for hydrolyzable chloride content by titrating an aliquot sample with 0.1N $AgNO_3$ solution. According to the analysis, the reaction mixture contained 5 percent by weight hydrolyzable chloride (HC). Based on the HC determination, 465 grams (4.6 mols) of triethylamine were added to the reaction mixture within a time period of 30 minutes, during which period the temperature of the reaction mixture was maintained at 50° C. The resulting slurry was then stirred for 1 hour at 50° C. To the slurry 570 grams of heavy aromatic naphtha and 580 grams of water were added and the mixture was stirred. The available HCl formed triethylamine hydrochloride and was separated from the mixture. After separation the organic phase was filtered through glass wool and then stripped for remaining water under vacuum. The produced carbamate was analyzed, and the results were as follows:

Unreacted pentyl-phenol 0.9 percent by weight, allophanate 1.7 percent by weight, pentyl-phenyl-N-methyl carbamate 97.4 percent by weight. (In the calculations, the heavy aromatic naphtha content was ignored, as it serves only as a diluent).

EXAMPLE 2

1680 grams (17 mols) of phosgene, at a rate of 5.25 mols/hr., and 500 grams (16.2 mols) of methylamine, at a rate of 5 mols/hr., were reacted in the same manner as described in example 1. The reaction temperature was maintained at 240°–290° C. and the residence time of the reaction mixture in the reactor was a nominal 6 seconds. The reaction mixture leaving the reactor was continuously introduced within a time period of 203 minutes into a 5 liter flask which contained 2460 grams (15 mols) of pentyl-phenol. The temperature of the flask was maintained at 50° C. during the feed period. At the end of the feed period, the flask was subjected to stripping under vacuum (approximately 25 mm. Hg) for a time period of 150 minutes to remove HCL. At the end of the stripping, the reaction mixture was analyzed for HC and according to the analysis described in example 1, the mixture contained 2.3 percent by weight of hydrolyzable chloride.

Two hundred fifty grams of the stripped reaction mixture was mixed with 62.5 grams of heavy, aromatic naphtha and 14.3 grams of trimethylamine were added. The admixture was stirred at 50° C. for a time period of 3 hours.

The product was purified as described in example 1; however, a small amount of HCl was added with the water to keep the pH below 7 for preventing hydrolysis of the produced pentyl-phenyl-N-methyl carbamate. The final product was analyzed and provided the following results: (excluding the heavy, aromatic naphtha content). Unreacted penthyl-phenol 0.2 percent by weight, allophanate 1.6 percent by weight, pentyl-phenyl-N-methyl-carbamate 98.2 percent by weight.

EXAMPLE 3

1800 grams (18.2 mols) of phosgene at a rate of 1.52 mols/hr. and 540 grams (17.4 mols) methylamine at a rate of 1.45 mols/hr. were reacted in the same manner as described in example 1. The reaction mixture leaving the reactor was continuously introduced within a time period of 12 hours into a 5 liter flask which contained 2715 grams (16.6 mols) of pentyl-phenol. The temperature of the flask was maintained at 40° C. during the feed period. At the end of the feed period the flask was subjected to stripping under vacuum (approximately 25 mm. Hg) for a time period of 60 minutes at 40° C. and the reaction mixture was analyzed. The analysis showed 0.7 percent by weight allophanate and 12 percent by weight unreacted pentyl-phenol. The reaction mixture was then purified as described in example 2 and the final analysis provided the following results (excluding the heavy, aromatic naphtha content): allophanate 0.7 percent by weight, unreacted pentylphenol 0.2 percent by weight, pentyl-n-methyl-carbamate 99.1 percent by weight.

EXAMPLE 4

10.3 grams (0.11 mol) of methyl-carbamoyl chloride was dissolved in 50 ml. benzene and 14.63 grams (0.10 mol) octanethiol-1 was added. The reaction mixture was stirred and maintained at 50° C., and at 15 minute intervals samples were withdrawn. The samples were washed with water and the organic phase was separated from the aqueous phase and dried over sodium sulfate, filtered and the benzene was stripped. The analyses showed that after 1 hour of reaction time, the reaction was complete. The product was analyzed and it was found to contain less than 0.1 percent by weight of unreacted octanethiol-1 and less than 0.1 percent by weight of allophanate, balance octyl-N-methyl-thiocarbamate.

EXAMPLE 5

10.3 grams (0.11 mol) of methyl-carbamoyl chloride, prepared according to the process described in example 1, was dissolved in 45 ml. benzene and 13.0 grams (0.10 mol) octanol-1 was added. The mixture was stirred and maintained at 50° C. and at 15 minute intervals samples were taken. Infrared analysis indicated that after 1 hour of reaction time, the product contained less than 0.1 percent by weight of unreacted octanol-1. The reaction mixture was then purified as shown in example 4. After strapping, the product was analyzed and the analysis provided the following results: less than 0.1 percent by weight of allophanate, less than 0.1 percent by weight of octanol-1, balance octyl-N-methyl-carbamate.

EXAMPLE 6

10.3 grams (0.11 mol) of methyl-carbamoyl chloride was dissolved in 50 ml. benzene and 12.85 grams (0.10 mol) 4-chlorophenol was added. The reaction mixture was stirred and maintained at 50° C. for a period of 3 hours. The reaction mixture was then stripped under vacuum for 5 minutes to remove dissolved HCl, followed by the gradual addition of trimethylamine under cooling and agitation until the produced slurry was alkaline to Universal Indicator. The alkaline slurry was then reheated to 50° C. and 50 ml. of benzene was added under stirring. After 3 hours of agitation, water was added to the solution to dissolve the trimethylamine hydrochloride, the organic phase was separated from the aqueous phase and dried over sodium sulfate. Then the organic solvent was stripped and the product recovered. The product was analyzed and it was found to contain less than 0.1 percent by weight of unreacted 4-chlorophenol, less than 0.1 percent by weight allophanate, balance 4-chloro-phenyl-N-methyl-carbamate.

EXAMPLE 7

10.3 grams (0.11 mol) of methyl-carbamoyl chloride was dissolved in 50 ml. benzene and 11.0 grams (0.10 mol) thiophenol was added. The reaction mixture was treated in the same manner as in example 6. The recovered product was analyzed and it was found to contain less than 0.1 percent by weight of unreacted thiophenol, traces of allophanate and balance phenyl-N-methyl-thiocarbamate.

EXAMPLE 8

10.3 grams (0.11 mol) of methyl-carbamoyl chloride was reacted with 14.4 grams (0.10 mol) of 60 naphthol in the presence of 50 ml. benzene in the same manner as in example 6. The recovered product was analyzed and it was found to contain less than 0.1 percent by weight of α naphthol, traces of allophanate, balance α-naphthyl-N-methyl-carbamate.

The above specific description and the examples are given for illustration only and variations and modifications can be made therein without departing from the spirit and scope of the appended claims.

What is claimed is:

1. A process for producing a carbamate having the general structure of $R_1$—NH—COO—$R_2$—Y wherein $R_1$ is an alkyl group having one to eight carbon atoms, and $R_2$ is an aliphatic, aromatic or alicyclic hydrocarbon, Y is hydrogen, chlorine or bromine or an alkyl group having one to six carbon atoms, which comprises:
   a. admixing phosgene and an alkyl amine having one to eight carbon atoms in a molecular ratio of at least 1 mol of phosgene per mol of amine at a temperature of from about 200° to 400° C. to produce a reaction mixture;
   b. admixing said first reaction mixture and an active hydrogen containing compound as determined by the Zerewitinoff method having the general structure HO—$R_2$—Y and selected from the group consisting of aliphatic alcohols phenols and alicyclic alcohols in a molecular ratio of about 0.9 to 1.1 mol of HO—$R_2$—Y per mol of alkyl amine to produce an admixture containing a major amount of said carbamate and minor amounts of HCl, unreacted HO—$R_2$—Y, alkyl-carbamoyl chloride and impurities;
   c. recovering said carbamate from the admixture.

2. Process according to claim 1, wherein to said admixture an acid acceptor is added in an excess of the amount required to neutralize HCl, to react with said alkyl carbamoyl chloride to form alkyl isocyanate and to catalyze the reaction between said alkyl isocyanate and said unreacted HX—$R_2$—Y to form carbamate.

3. Process according to claim 2, wherein prior to the addition of said acid acceptor a portion of the HCl is removed from said admixture.

4. Process according to claim 2, wherein the acid acceptor is a tertiary amine.

5. Process according to claim 1, wherein the active hydrogen containing compound is an aliphatic alcohol.

6. Process according to claim 1, wherein the active hydrogen containing compound is a phenol.

7. Process according to claim 1, wherein the active hydrogen containing compound is an alicyclic alcohol.

8. Process according to claim 1, wherein Y is hydrogen.

9. Process according to claim 1, wherein Y is chlorine.

10. Process according to claim 1, wherein Y is bromine.

11. Process according to claim 1, wherein Y is an alkyl group having one to six carbon atoms.

12. Process according to claim 1, wherein HX—$R_2$—Y is naphthol.

13. A process for producing pentyl-phenyl-N-methyl carbamate which comprises:
   a. admixing phosgene and methyl amine in a molecular ratio of at least 1 mol of phosgene per mol of methylamine at a temperature of from about 200° to 400° C. to produce a reaction mixture,
   b. admixing said first reaction mixture and pentylphenol in a molecular ratio of about 0.9 to 1.1 mol of pentylphenol per mol of methyl amine at a temperature below 95° C. to produce an admixture containing a major amount of said carbamate and minor amounts of HCl, unreacted pentylphenol, methyl-carbamoyl chloride and impurities,
   c. recovering said carbamate from the admixture.

14. Process according to claim 13, wherein to said admixture an acid acceptor is added in an excess of the amount required to neutralize HCl, to react with said methyl carbamoyl chloride to form methyl isocyanate and to catalyze the reaction between said methyl isocyanate and said unreacted pentyl-phenol.

15. Process according to claim 14, wherein prior to the addition of said acid acceptor a portion of the HCl is removed from said admixture.

16. Process according to claim 14, wherein the acid acceptor is a tertiary amine.

* * * * *

UNITED STATES PATENT OFFICE
CERTIFICATE OF CORRECTION

Patent No. 3,625,993          Dated December 7, 1971

Inventor(s) Hans Peter Horn

It is certified that error appears in the above-identified patent and that said Letters Patent are hereby corrected as shown below:

Column 2, line 19-20, delete second R-NCO+2HCl (1) (it's a repeat)

Column 2, line 48, "rations" should be -- ratios --;

Column 3, line 68, "mole" should be -- mols --;

Column 4, line 6, "admixed the" should be -- admixed with the --;

Column 7, line 29, "strapping" should be -- stripping --;

Column 7, line 67, "60 naphthal" should be --$\alpha$ naphthal --;

Column 8, line 29, "HX" should be -- HO --; and

Column 8, line 47, "HX" should be -- HO --.

Signed and sealed this 6th day of June 1972.

(SEAL)
Attest:

EDWARD M. FLETCHER, JR.          ROBERT GOTTSCHALK
Attesting Officer                Commissioner of Patents